United States Patent [19]

Koroly et al.

[11] 4,309,634

[45] Jan. 5, 1982

[54] STATOR WINDING PERIPHERAL CONNECTOR RINGS

[75] Inventors: James S. Koroly, North Huntingdon, Pa.; Robert M. Sexton, Johns Island, S.C.

[73] Assignee: Westinghouse Electric Corp., Pittsburgh, Pa.

[21] Appl. No.: 139,084

[22] Filed: Apr. 10, 1980

[51] Int. Cl.³ .......................................... H02K 17/00
[52] U.S. Cl. ...................... 310/201; 310/184
[58] Field of Search .............................. 310/179–208, 310/260, 270

[56] References Cited

U.S. PATENT DOCUMENTS

| | | | |
|---|---|---|---|
| 589,839 | 9/1897 | Lamme | 310/201 |
| 692,022 | 1/1902 | Lamme | 310/201 |
| 1,172,517 | 2/1916 | Cour | 310/201 |
| 1,826,296 | 10/1931 | Apple | 310/201 |
| 2,407,935 | 9/1946 | Perfetti et al. | 310/260 X |
| 3,453,468 | 7/1969 | Lund | 310/260 X |
| 4,028,572 | 6/1977 | Baltisberger | 310/201 |

FOREIGN PATENT DOCUMENTS 1254231  11/1967  Fed. Rep. of Germany ...... 310/201

*Primary Examiner*—Mark O. Budd
*Attorney, Agent, or Firm*—W. D. Lanyi

[57] ABSTRACT

A polyphase stator winding of a dynamoelectric machine including a plurality of multi-loop coils which are circumscribed about one another. Each coil has at least one loop that constitutes two coil sides (a top or radially inner conductor and a bottom or radially outer conductor) and two involuted connector rings segments.

The coil sides are embedded within slots formed in a tubular stator core and the connector rings are situated on both axial ends of the stator. The slots extend radially outward from the stator core's inner periphery. The top coil sides have varying lengths, extend beyond the end of the stator core, and are positioned around the stator's inner periphery such that no top coil side has a circumferentially adjacent coil side with an identical of axial overhang. Connections between top and bottom coil sides separated by a coil pitch is provided by two connected involuted connector ring segments.

3 Claims, 5 Drawing Figures

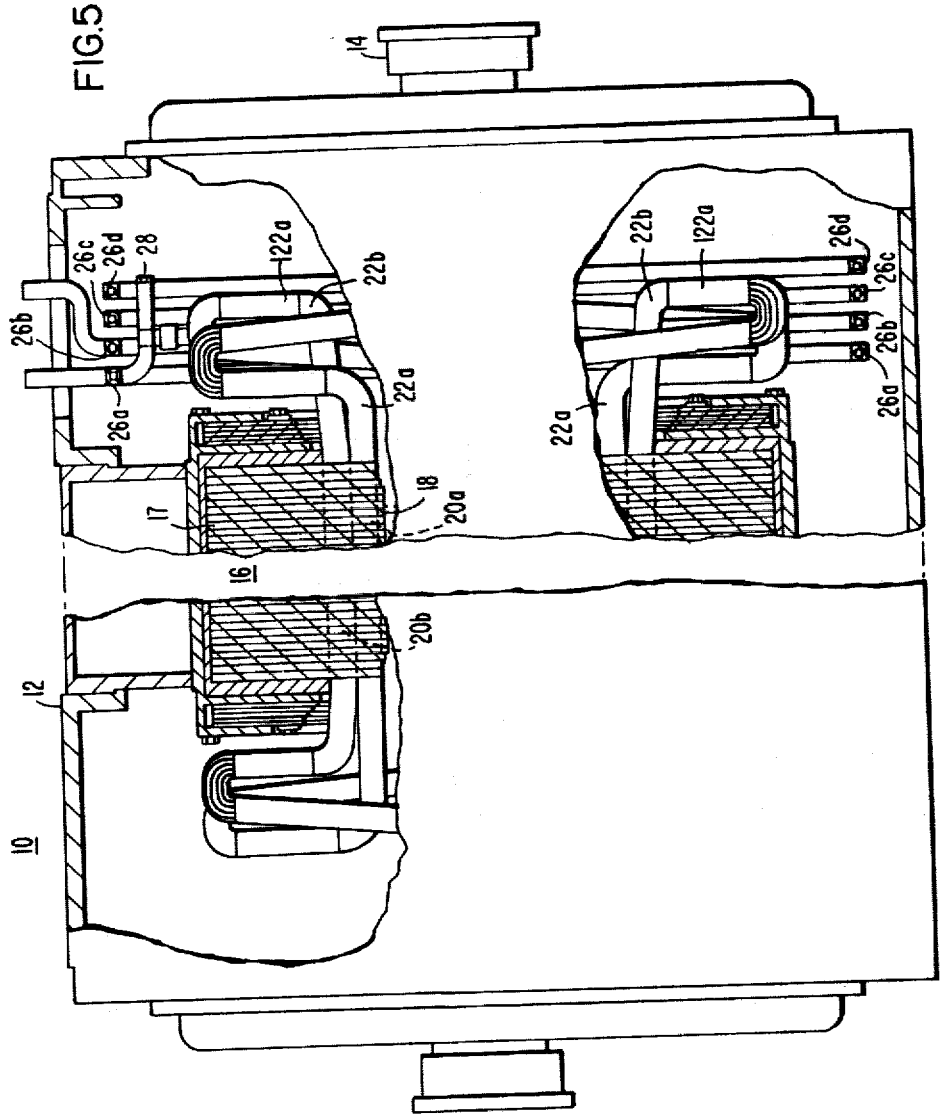

STATOR WINDING PERIPHERAL CONNECTOR RINGS

BRIEF DESCRIPTION OF THE PRIOR ART AND SUMMARY OF THE INVENTION

This invention relates to dynamoelectric machines having stator structures with multi-looped stator winding coils disposed therein and more particularly to stator windings having coil sides with axially staggered overhangs.

Large dynamoelectric machine designs have evolved which use a rather complicated stator winding disposed in axially extending slots formed in a stator core to handle the voltages and currents required by the loading demands made on the machine. A large number of stator slots, the use of parallel windings in each phase, and the multiple loops per coil require a complex end connection for the winding's slot disposed coil sides. The end connection must be accommodated in a restricted space, and provide the necessary electrical communication between the stator coil sides.

The previous design included a stator winding with an end basket having "diamond-shaped" coil loops. Each coil included a predetermined number of loops with each loop having two coil sides. The coil sides each included a straight portion which ran the length of the stator slots and a complexly shaped portion situated at each end thereof which facilitated connection with other curved portions. This curved portion had a complex shape which curved axially, radially and circumferentially. The manufacturing of this coil side portion required a complexly shaped three-dimensional form against which the coil sides were bent and twisted. The stator coil sides were woven together and connected in the axial end regions of the machine to form the diamond-shaped end basket design which has been typically used on large dynamoelectric machines.

The woven-together end-basket design enables completion of the necessary stator coil side connections and provides a compact and rugged structure. However, one disadvantage of the end-basket design is that the interweaving of the coil sides makes it impossible to remove a single coil side from the bottom of a stator slot without removing from twelve to eighteen top coil sides which obstruct its removal.

A polyphase stator winding of a dynamoelectric machine in accordance with the present invention that overcomes the disadvantages noted above constitutes a plurality of coils which are circumscribed about one another. Selected coils each have at least a single coil loop that includes one end turn. Each end turn has two coil sides (a top or radially inner and a bottom or radially outer conductor) and two involuted connector ring segments.

The top coil sides are embedded within the stator's slots over the bottom coil sides and occupy a position nearer the stator's bore. The top coil sides extend beyond the stator's core on each axial end by varying lengths (overhang) and are positioned around the stator's inner periphery such that no top coil side has a circumferentially adjacent top coil side with an identical axial overhang. Each top coil side is connected to a bottom coil side located a coil pitch away by the two previously mentioned involuted connector ring segments. This type of connection results in the coils being arranged into banks of coil sides of varying lengths.

The involute-shaped connector ring segments are nested in the end turn regions of the macine. The portions of the involutes connected to the top coil sides are developed to provide adequate clearance from the circumferentially adjacent involute portions as well as the involute portions located up to three or more coil pitches away. Clearance between connector ring segments joined to coil sides in adjacent slots is provided by displacement in an axial direction of the connection interface between the connector ring segments and the top coil sides. Such axial displacement is preferably provided by serially increasing the length of circumferentially adjacent top coil sides for three circumferentially consecutive top coil sides and every three thereafter to result in the top coil side connections being grouped into three banks. In other words every third connection to a top coil side is at the same axial position. In the case where the number of stator slots is divisible by two, a variation is to group the connections of the bottom coil sides in two banks and the connections for the top coil sides in two banks.

Another embodiment of the invention has axial overhangs of the bottom coil sides on one end of the stator's core and axial overhangs of the top coil sides on the other end of the stator's core. This provides a very compact arrangement in the dynamoelectric machine's end turn regions.

The coil sides and involute-shaped connector ring segments preferably constitute materials of relatively high conductivity. The conductive materials can be fabricated to facilitate modern design specifications such as roebelled copper strands which are water cooled, and insulated, or the involuted connector ring segments can be made from conductors such as hollow copper bars.

BRIEF DESCRIPTION OF THE DRAWINGS

Many other advantages and purposes of the invention will be clear from reading the following detailed description of a preferred embodiment, taken in connection with the accompanying drawings, in which:

FIG. 5 is a partial sectional view of a dynamoelectric machine having both the top and bottom coil side connections banked.

DESCRIPTION OF THE PREFERRED EMBODIMENTS

Figure 1:
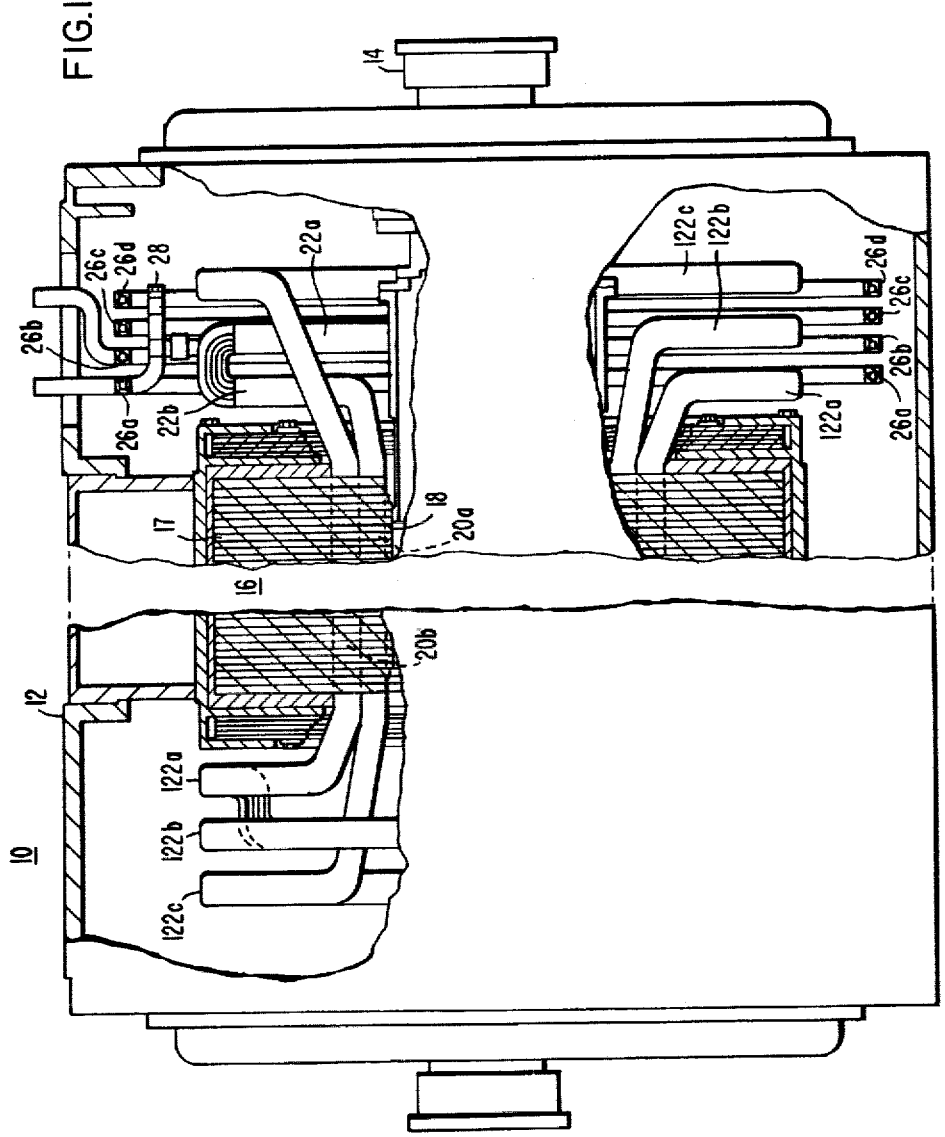
FIG. 1 is a partial sectional view of a dynamoelectric machine made in accordance with this invention.

Referring now to the drawings in detail, FIG. 1 shows a partial sectional view of a dynamoelectric machine 10 having an outer housing 12, a rotor 14 and a stator structure 16 which includes tubular cores 17 which has multi-loop coils 18 disposed therein constituting the stator winding. Each of the coil loops has a top coil side 20a, a bottom coil side 20b, and involute-shaped connector ring segment portions 22a and 22b which together constitute a connector ring segment which joins the coil sides. Connected top and bottom coil sides 20a and 20b, respectively, are embedded within slots, not shown, in radial layers around the inner periphery of the stator core 17. The connector ring segments are grouped into three banks 122a, 122b, and 122c.

Cooling is preferably provided by liquid coolant supplied through four banks of parallel rings 26a, 26b, 26c, and 26d which are schematically shown as part of the cooling system for the coils of the dynamoelectric machine and are connected to the coils 18 by insulated tubing 28.

Figure 2:
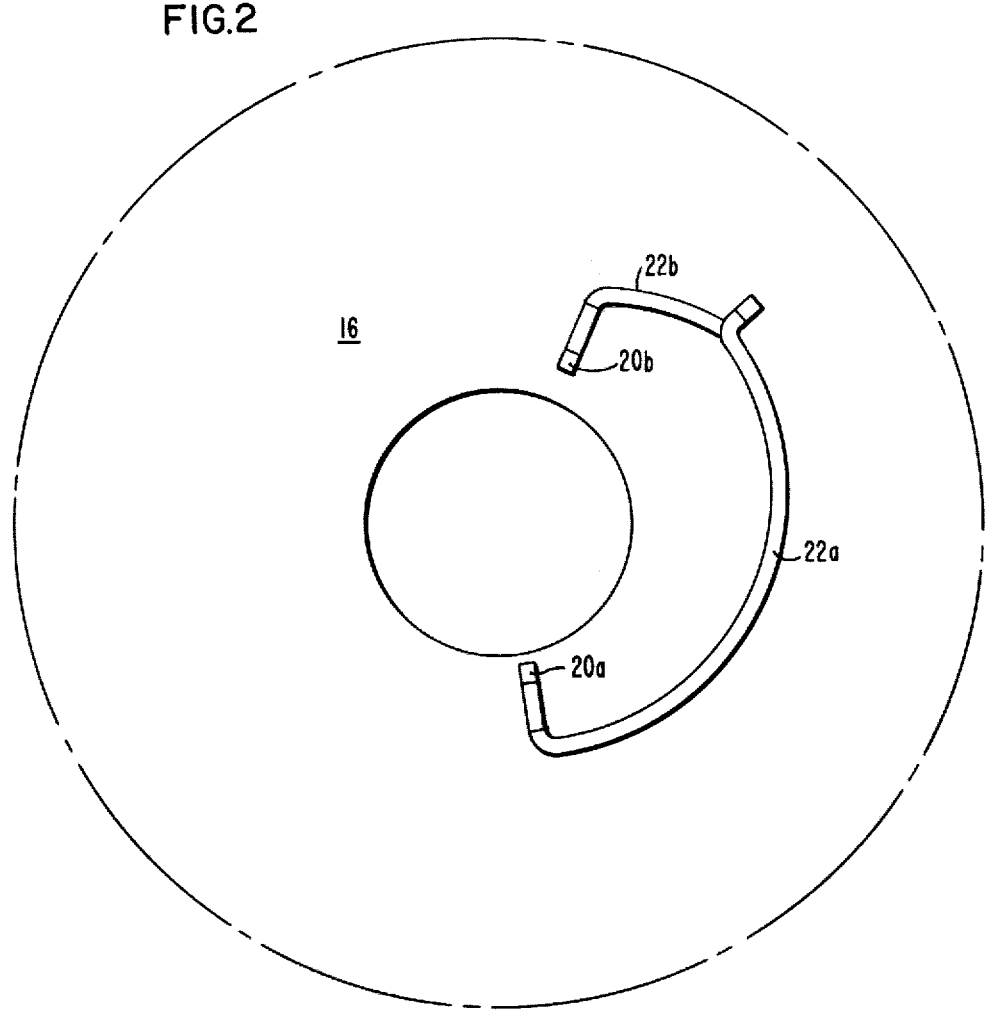
FIG. 2 is a simplified partial end view of the dynamoelectric machine of FIG. 1 showing a connection for a single coil loop.

FIG. 2 is an end view of stator core 17 illustrating, for the sake of clarity, a single, exemplary connector ring segment 122. Top coil side 20a extends axially out from the stator core slot S12 and is connected to bottom coil side 20b that is located in slot S1. One coil pitch is spanned by connector ring segment portions 22a and 22b which, together, constitute exemplary connector ring segment 122.

Figure 3:
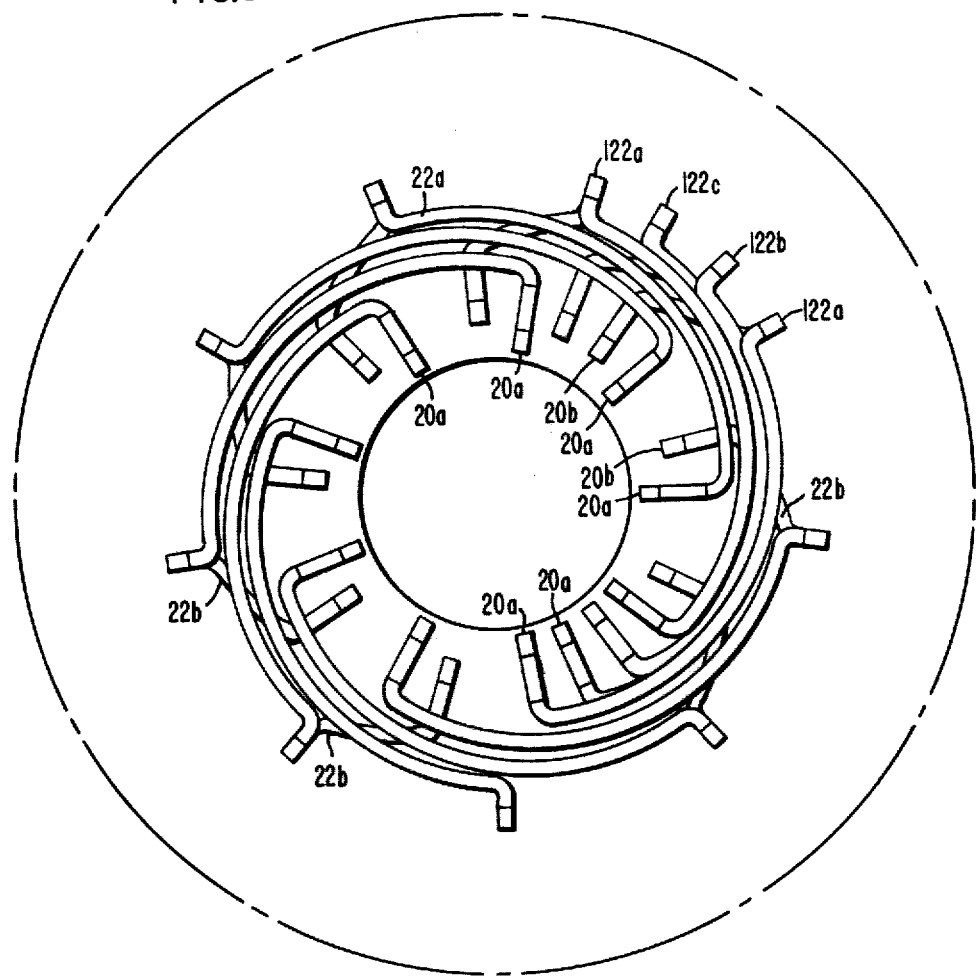
FIG. 3 is a view of the end region of the stator core of the dynamoelectric machine of FIG. 1 showing the connections between the coil sides and the connector ring segments.

A partially completed stator end winding, as shown in FIG. 3, includes arranging the end turns 122 into the three banks 122a, 122b, and 122c. Each bottom coil side 20b is connected to an involute-shaped connector ring segment portion 22b that runs from the bottom coil side 20b for a circumferential distance of approximately three slots where it is connected to a second connector ring segment portion 22a which, in turn, is connected to a top coil side 20a one coil pitch away or, in the case of FIG. 3, eleven slots away. It should be noted that the overhang beyond each axial end of stator core 17 of top coil side 20a for connector ring segment 122a is shorter than the adjacent top coil side 20a for connector ring segment 122b with the longest overhang occurring on top coil side 20a for connector ring segment 122c. Staggering the top coil sides 20a into groups of three facilitates the use of identical involuted connector ring segment portions 22a and identical involuted connector ring segment portions 22b.

Figure 4:
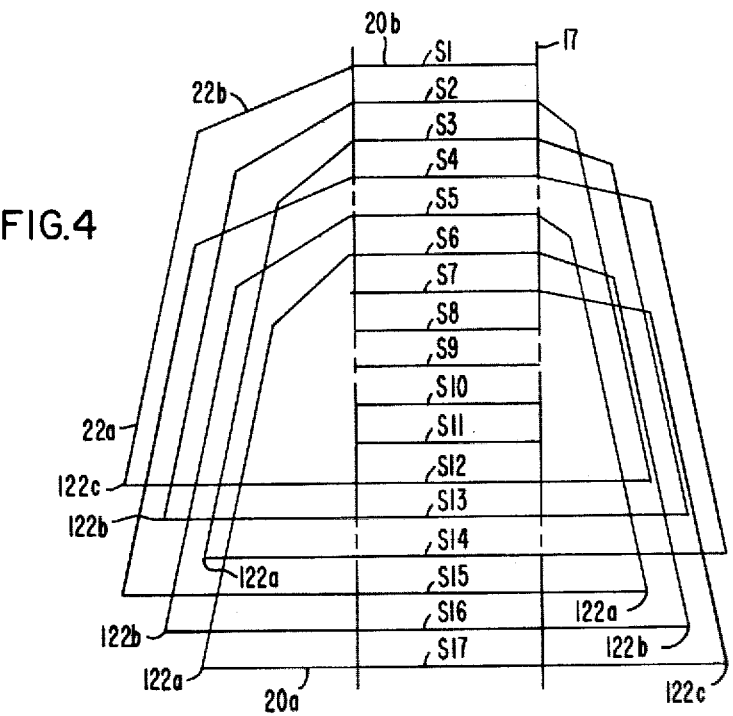
FIG. 4 is a schematic diagram of the stator coil connections made in accordance with this invention.

FIG. 4 is a schematic diagram of the stator winding showing the connector ring segments being banked in three's. Only the bottom coil sides 20b are shown in slots S1 through S6 and only the top coil sides 20a are shown in slots S12 through S17. The three banks are generally indicated by 122a, 122b, and 122c and preferably obtain from axially displacing the top coil sides in circumferentially adjacent slots and repeating the pattern every three slots.

FIG. 5, which is similar to FIG. 1, illustrates an even number of stator slots which is not divisible by three. As such, the connector ring segment banks are divided into two banks, 122a and 122b. In this arrangement both the top coil sides 20a and bottom coil sides 20b have an axial overhang on opposite axial ends of stator structure 16.

Figure 6:
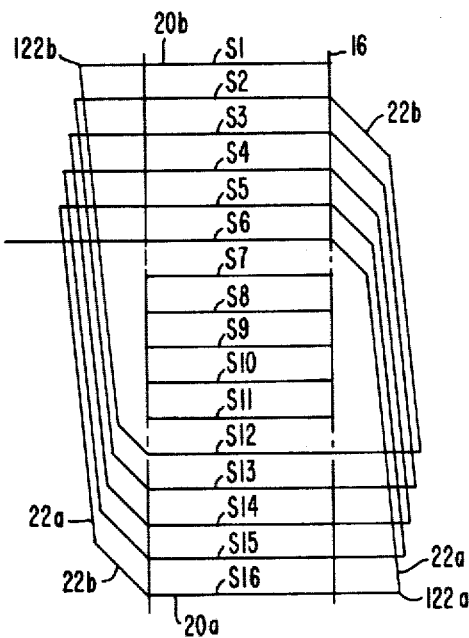

FIG. 6 provides a schematic diagram for the stator winding of FIG. 5 wherein the top and bottom coil sides have overhangs on the opposite ends of the stator's core 17. For the sake of clarity slots S1 thorugh S6 are shown containing only bottom coil sides 20b and slots S12 through S16 are shown containing only top coil sides 20a. Short involute segments 22b connect coil sides 20a or 20b to long involute segment 22a. The long involuted segments 22a are connected to coil sides 20a or 20b so as to complete the end turn. Bank 122a is situated on one end of the stator and bank 122b is disposed on the other end of the stator. Another embodiment of the present invention includes varying the axial overhangs of the top and bottom coil sides on both ends of stator core 17. If the overhangs were provided by varying the axial displacements of the coil sides rather than using coil sides of varying length, then coil sides of a single length could be used for any machine. Furthermore, only two sizes of connector ring segment portions 22a and 22b would be required for the utilizing machine.

It is now apparent that a dynamoelectric machine has been provided which permits large reductions in manufacturing cost, assembly and disassembly time, as well as allowing the use of uniform sized connector ring segments.

We claim:

1. A dynamoelectric machine comprising:
   a generally tubular stator core having a plurality of slots formed in said core's inner periphery; and
   a stator winding disposed in said slots, said stator winding comprising;
   a first top coil side disposed in a first slot of said stator core, said first top coil side extending axially a first predetermined axial distance beyond said stator core's first end;
   a first bottom coil side disposed in a second slot of said stator core, said second slot being circumferentially separated from said first slot by a coil pitch, said first bottom coil side extending axially a second predetermined axial distance beyond said stator core's first end;
   a first connector ring segment connecting said first top and bottom coil sides at said stator core's first end, said ring segment comprising;
   (a) a first portion extending a predetermined arcuate distance from and connected to said first top coil side toward said first bottom coil side;
   (b) a second portion extending the remaining arcuate distance between the first portion and said first bottom conductor, said second portion being attached to said first portion and said first bottom coil side; and
   (c) wherein said predetermined arcuate distance extended by said first portion is substantially longer than said remaining arcuate distance extended by said second portion; and
   wherein said first preselected axial distance is greater than said second predetermined axial distance.

2. The dynamoelectric machine of claim 1, further comprising:
   a second top coil side disposed in a third slot of said stator core, siad second top coil side extending a greater axial distance beyond said first stator core end than said first conductor;
   a second bottom coil side disposed in a fourth slot at said stator core, said fourth slot being circumferentially separated from said third slot by a coil pitch, said second bottom coil side extending a third predetermined axial distance beyond said stator core's first end; and
   a second connector ring segment connecting said second top and bottom coil sides at said stator core's first end.

3. The dynamoelectric machine of claim 2 wherein said third predetermined axial distance is equal to said second predetermined axial distance; and
   wherein said first and third slots are circumferentially adjacent and said second and fourth slots are circumferentially adjacent.

* * * * *